United States Patent [19]
Parker et al.

[11] Patent Number: 5,396,436
[45] Date of Patent: Mar. 7, 1995

[54] WHEEL BALANCING APPARATUS AND METHOD WITH IMPROVED CALIBRATION AND IMPROVED IMBALANCE DETERMINATION

[75] Inventors: Dan Parker, Kirkwood; Michael W. Douglas, St. Peters, both of Mo.

[73] Assignee: Hunter Engineering Corporation, Bridgeton, Mo.

[21] Appl. No.: 829,983

[22] Filed: Feb. 3, 1992

[51] Int. Cl.$^6$ .................................................. G01M 1/22
[52] U.S. Cl. ...................................... 364/508; 364/463; 364/571.01; 73/462
[58] Field of Search ............... 364/506, 508, 571.01, 364/571.04, 149, 151, 463; 33/203, 203.12; 73/146, 462

[56] References Cited
U.S. PATENT DOCUMENTS

| | | | |
|---|---|---|---|
| Re. 31,971 | 8/1985 | Gold | 73/462 |
| 4,338,818 | 7/1982 | Hill et al. | 73/462 |
| 4,457,172 | 7/1984 | Mathes et al. | 73/462 |
| 4,494,400 | 1/1985 | Hill | 73/1 B |
| 4,776,215 | 10/1988 | Curchod | 73/462 |
| 4,891,981 | 1/1990 | Schonfeld | 73/460 |
| 5,008,826 | 4/1991 | Staudinger et al. | 364/463 |
| 5,053,987 | 10/1991 | Genusov et al. | 364/736 |
| 5,208,758 | 5/1993 | Okumura | 364/463 |

Primary Examiner—Michael Zanelli
Attorney, Agent, or Firm—Polster, Lieder, Woodruff & Lucchesi

[57] ABSTRACT

A wheel balancer has a spindle for mounting a wheel/tire assembly thereon, a motor for spinning the spindle about its longitudinal axis, and at least two sensors for sensing imbalance forces. A set of calibration coefficients for the wheel balancer are determined solely from the measurements made during a set of calibration spins and from knowledge of the amount of imbalance mounted to the rotating spindle during the calibration spins, without any knowledge or measurement of the relative geometry of the balancer. The set of calibration coefficients and other calibration data is stored in an electronic memory for subsequent use in balancing a wheel/tire assembly. During balancing, a wheel/tire assembly mounted on the spindle is spun and the corresponding output signals of the sensors are measured and recorded. The imbalance of the wheel tire assembly is then iteratively determined using the stored calibration coefficients, the stored calibration data, and the measured sensor output signals corresponding to the spin of the mounted wheel/tire assembly.

55 Claims, 2 Drawing Sheets

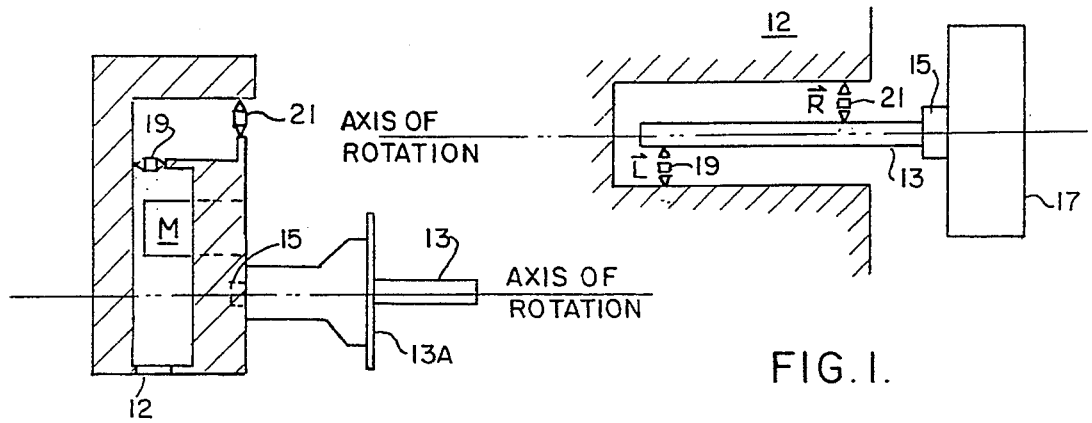
FIG. 1.
FIG. 2.
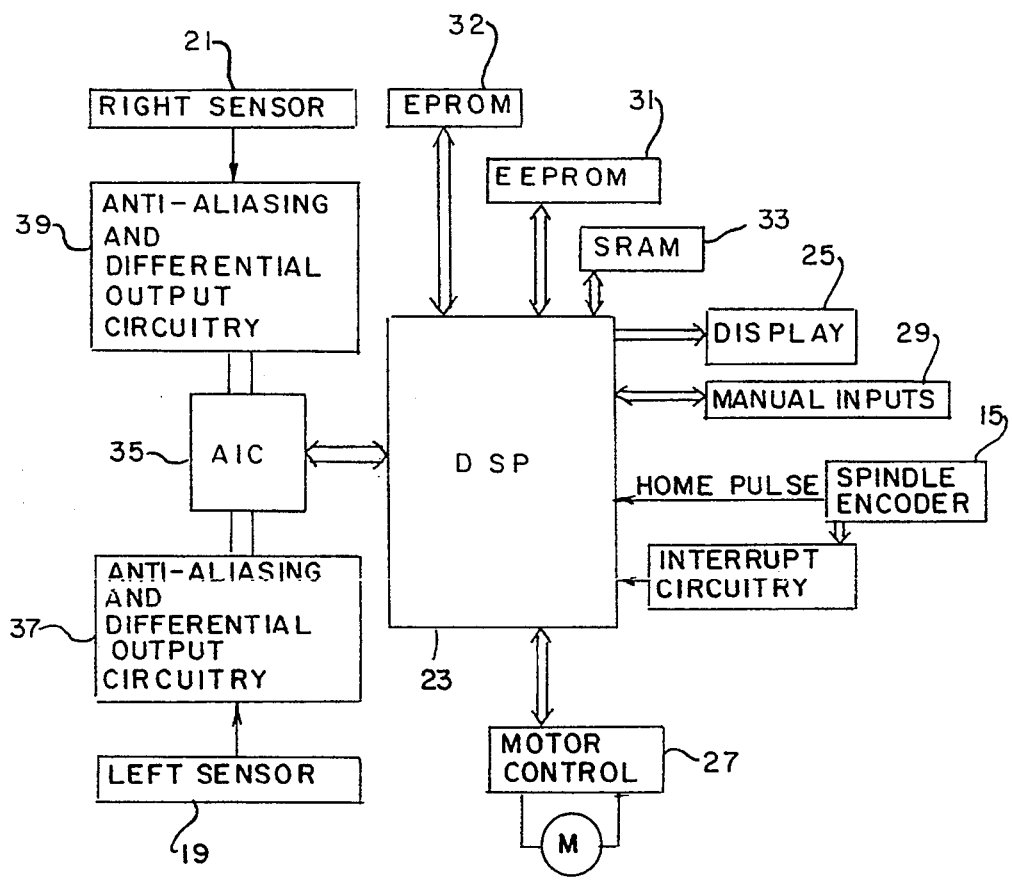
FIG. 3.

WHEEL BALANCING APPARATUS AND METHOD WITH IMPROVED CALIBRATION AND IMPROVED IMBALANCE DETERMINATION

BACKGROUND OF THE INVENTION

This invention relates generally to analyzing imbalance of rotating vehicle wheel, and in particular to calibrating wheel balancer apparatus and analyzing wheel/tire imbalance to determine the magnitude and angular location of corrective counter-balance mass(es) to be be placed on the wheel rim(s).

The determination of unbalance in vehicle wheels is carried out by an analysis with reference to phase and amplitude of the mechanical vibrations caused by rotating unbalanced masses in the wheel. The mechanical vibrations are measured as motions, forces, or pressures by means of transducers, which convert the mechanical vibrations to electrical signals. Each signal is the combination of fundamental oscillations caused by the imbalances, and noise.

It is necessary to calibrate each wheel balancer to take into account manufacturing variations in the components, such as the spindle on which the wheel/tire assembly is mounted, the sensor/transducers, and the electronic circuitry, for example. Moreover, considerable expense has been incurred in connection with prior art balancers to obtain precision parts to limit as much as possible the balancer-to-balancer variation.

Heretofore, accuracy in wheel balancing was also affected by the requirement that the precise geometrical relationship of the sensors to the wheel be known in order to accurately calculate imbalance. Changes in the sensor spacing, for example, or loose tolerances with respect to the geometry, could result in considerable errors in the resulting wheel imbalance measurement made by prior wheel balancers. The requirement of producing balancers with precise geometrical relationship of the sensors to the wheel results in high manufacturing costs, poor performance, and greater maintenance.

Even when calibrated properly and with precision components, prior art wheel balancers are not as accurate as they could be. Existing balancers for the most part use various models of the balancer structure to make a first estimate of wheel/tire imbalance and accept that first estimate as the actual imbalance. If the construction of the balancer does not match the requirements of the model, considerable inaccuracies in measurement of imbalance results. In fact, these first estimates of wheel/tire imbalance can be substantially improved.

In addition, the imbalance measurements obtained using existing wheel balancers are not as reproducible as could be desired.

SUMMARY OF THE INVENTION

Among the various objects and features of the present invention is a wheel balancer with improved performance.

Another object is the provision of such a wheel balancer whose operation and accuracy is not closely tied to any particular sensor or sensor mounting geometry.

A third object is the provision of such a wheel balancer with greatly increased accuracy.

A fourth object is the provision of such a wheel balancer with an improved calibration method.

A fifth object is the provision of such a wheel balancer which does not require such accurate tolerances in its mechanical components.

A sixth object is the provision of such a wheel balancer with accurately reproducible imbalance measurements.

Other objects and features will be in part apparent and in part pointed out hereinafter.

Briefly, a method of the present invention is directed to operating a wheel balancer. The balancer has a spindle for mounting a wheel/tire assembly thereon, a motor for spinning the spindle about its longitudinal axis, and at least two sensors for sensing imbalance forces. The method includes the steps of determining a set of calibration coefficients for the wheel balancer from measurements made during a set of calibration spins and from knowledge of the imbalances mounted to the spindle during the calibration spins, and storing the set of calibration coefficients in an electronic memory for subsequent use in balancing a wheel/tire assembly.

A wheel balancer of the present invention includes a spindle for mounting a wheel/tire assembly thereon, a motor for spinning the spindle about its longitudinal axis, and at least two sensors for sensing imbalance forces. Circuitry is provided for determining a set of calibration coefficients for the wheel balancer from measurements made during a set of calibration spins and from knowledge of the imbalances mounted to the spindle during the calibration spins. An electronic memory is included for storing the set of calibration coefficients for subsequent use in balancing a wheel/tire assembly.

In another aspect of the present invention, a method of operating a wheel balancer includes the steps of storing a set of calibration coefficients in an electronic memory for subsequent use in balancing a wheel/tire assembly, and storing calibration data in addition to the calibration coefficients in electronic memory for subsequent use in balancing a wheel/tire assembly. It further includes the steps of spinning a wheel/tire assembly mounted on the spindle, measuring and recording the corresponding output signals of the sensors, and iteratively determining the actual imbalance of the wheel/tire assembly using the stored calibration coefficients, the stored calibration data, and the measured sensor output signals corresponding to the spin of the mounted wheel/tire assembly.

BRIEF DESCRIPTION OF THE DRAWINGS

FIG. 1 is a diagrammatic view illustrating a generic wheel balancer suitable for use with the present invention;

FIG. 2 is a simplified top plan view illustrating the preferred embodiment of the wheel balancer of the present invention;

FIG. 3 is a block diagram illustrating the electrical circuitry of the wheel balancer of FIG. 1 or FIG. 2;

Similar reference characters indicate similar parts throughout the several views of the drawings.

DESCRIPTION OF THE PREFERRED EMBODIMENT

Figure 4:
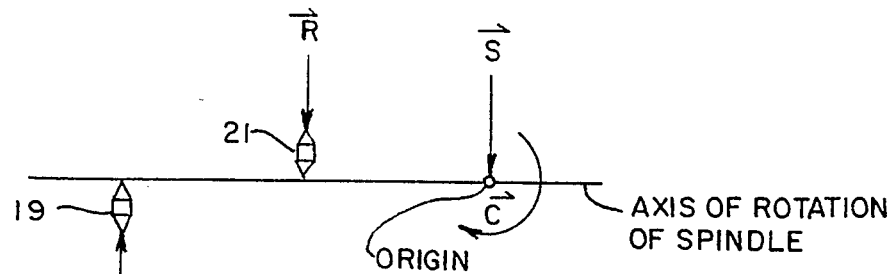
FIG. 4 is a graphical representation of a simplified model of wheel imbalance.

Turning to the drawings, FIG. 1 illustrates (in simplified form) the mechanical aspects of a generic wheel balancer 11 suitable for the present invention. Balancer 11 includes a rotatable shaft or spindle 13 driven by a suitable drive mechanism such as an electric motor M (FIG. 2). Mounted at one end of spindle 13 is a conventional quadrature phase optical shaft encoder 15 which provides speed and rotational position information to the circuitry of FIG. 3.

During the operation of wheel balancing, at the other end of spindle 13, a wheel/tire assembly 17 under test is removably mounted for rotation with spindle hub 13A. To determine wheel/tire assembly imbalance, the balancer includes at least a pair of piezoelectric transducers 19 and 21 (or other suitable sensors such as strain gauges) coupled to spindle 13 and mounted on the balancer base 12. For ease of reference herein, sensor 19 is referred to as the "L" sensor and sensor 21 is referred to as the "R" sensor.

Turning to FIG. 2, it can be seen that the actual construction of the mechanical aspects of balancer 11 can take a variety of forms. For example, spindle 13 can include a hub 13A against which wheel/tire assembly 17 abuts during the balancing procedure. Moreover, sensor "L" and sensor "R" need not directly abut spindle 13. For example, various arms or rods as shown in FIG. 2 can be used to mechanically couple the sensors to the spindle so that they are exposed to the vibrations of the spindle.

When wheel/tire assembly 17 is unbalanced, it vibrates in a periodic manner, and these vibrations are transmitted to spindle 13. The "L" and "R" sensors are responsive to these vibrations of the spindle. Specifically, they generate a pair of analog electrical signals corresponding in phase and magnitude to the vibrations of the spindle at the particular transducer locations. These analog signals are input to the circuitry of FIG. 3, described below.

In addition to the imbalance which occurs when an unbalanced wheel/tire assembly is spun on the balancer, there could also be imbalance in the spindle itself. This residual spindle imbalance affects all the measurements of the sensors and is compensated for in the present invention, as described presently.

Note that although the vibrations experienced by the "L" and "R" sensors are a function of the location of those sensors, the present invention does not directly measure or input those locations. This makes the method of the present invention extremely versatile in terms of transportability between wheel balancers of different mechanical designs. In fact, the precise mechanical construction and geometrical relationships of the components of balancer 11 are relatively unimportant. This, of course, greatly simplifies the design and construction of balancer 11, and is a considerable improvement in the art of measuring imbalance.

Turning to FIG. 3, wheel balancer 11 includes not only the "L" and "R" sensors, and spindle encoder 15, but also a digital signal processing (DSP) chip 23. Preferably DSP chip 23 is an Analog Devices model ADSP-2105. For a discussion of the use of DSP chips in wheel balancers, reference is made to co-pending U.S. application 07/594,043, filed Oct. 9, 1990, the disclosure of which is incorporated herein by reference.

DSP chip 23 performs signal processing on the output signals from the "L" and "R" sensors as described below. In addition it is connected to and controls a display 25 which provides information to the user, controls motor M through conventional motor control circuitry 27, and keeps track of the spindle position from encoder 15. More specifically, encoder 15 is a 128 count, two channel quadrature encoder which is fully decoded to 512 counts per wheel revolution by DSP chip 23.

Balancer 11 also includes manual inputs 29 (such as a keyboard and parameter input data dials) which are also connected to DSP chip 23. By using DSP chip 23, no general purpose computer or microprocessor is needed for balancer 11. Chip 23 has sufficient capacity to control via software all the operations of the balancer. The DSP chip is connected to EEPROM memory 31, EPROM memory 32, and static RAM (SRAM) memory 33. The EEPROM memory is used to store non-volatile information, such as calibration data, while the DSP chip uses SRAM 33 (as discussed below) for storing temporary data.

DSP chip 23 is also connected to an analog input circuit (AIC) 35 which is preferably a Texas Instruments TLC32040 type device. AIC 35 is a fourteen (14) bit, two channel A/D converter with serial interface, and an on-board voltage reference. It is software programmable (via the serial interface) to have a gain of one, two or four, for a total dynamic range of sixteen (16) bits.

The signals from the "L" and "R" sensors are supplied through anti-aliasing and differential output circuitry 37, 39 to AIC 35. More specifically, the output signals from left and right force transducers 19 and 21 are each fed through unity gain buffers (not shown but well known in the art), to anti-aliasing filters making up part of circuitry 37, 39. Sallen/Key type low pass Butterworth filters function well for this purpose. (For a discussion of aliasing, reference is made to the aforementioned co-pending application.) The outputs of the anti-aliasing filters are fed into simple differential output converter circuits of conventional design. Then the differential outputs of circuits 37, 39 are fed into the differential inputs of AIC 35.

"L" sensor samples are taken by DSP chip 23 at counts 0, 16, 32 . . . of spindle encoder 15 while "R" sensor samples are taken at counts 8, 24, 40 . . . etc. A home pulse is also provided. Once sampling has commenced, eight (8) revolutions of samples are taken for a total of 256 samples of each sensor.

The spin cycle of balancer 11 works as follows: Upon receiving the signal to spin (from the manual input circuitry 29), DSP chip 23 instructs AIC 35 via the serial interface to acquire the left channel (the output signal of sensor "L") at the AIC's maximum sampling rate of 19.2 kHz. The DSP chip ignores the received data words in the serial port receive register at this time. The wheel/tire assembly spins until a minimum time of three (3) seconds has elapsed to allow the system to "settle" from the initial shock of the motor starting, after which the DSP, through software, waits until the spin rate has reached a required minimum angular velocity, normally about 4 Hz.

Next, DSP chip 23 waits for the home pulse from spindle encoder 15 to occur. After detecting the home pulse, the DSP chip assigns the next falling edge of the "A" channel quadrature pulse as encoder position 0 and takes a sample by fetching whatever data word is residing in the serial port receive register. This word is the most recent data sample measured by the AIC, which is then normalized by the DSP for the instantaneous rpm of the spindle by the following method: Full speed due to the windings of the motor, line frequency, and pulley ratios is 330 rpm. Thirty-two (32) samples for each channel are acquired for each turn of the wheel/tire assembly, or sixty-four (64) samples per turn of the wheel/tire assembly. The spindle encoder makes 512 interrupts per turn of the wheel, so the circuitry of FIG. 3 takes a sample every eight (8) interrupts, switching channels each time. DSP chip 23 runs at 10 Mhz. The number of DSP cycles is noted by chip 23 between these eight (8) interrupts to obtain a time between 1/64 revolution of the wheel/tire assembly. At full speed this number is:

$$\frac{1}{330/60} \times \frac{1}{64} \times 10{,}000{,}000 = 28409 \; DSP \; \text{CYCLES}$$

If this number is greater than 28409, then the wheel/tire assembly is not up to full speed and the acquired sample will be smaller than had the wheel been at full rpm. This acquired magnitude is normalized by DSP chip 23 using the square law:

Mag=m * r * [angular velocity]**2 where "m"=mass imbalance and "r"=radius from center of angular rotation to centroid of "m."

In practice, the "r" and "m" values are not needed to normalize the acquired data. The actual equation used is: normalized data=data * ((measured number of cycles)/28409)**2

Note should also be taken that if the wheel/tire assembly is heavy enough, samples can be taken before the wheel is up to full speed, while it is substantially accelerating. Motor and belt noise inherent in the samples will be completely removed in the digital domain by the DSP chip as described later. Since the rpm normalization is performed on-the-fly based on instantaneous rpm at-every-sample, the acceleration does not affect the result.

The normalized result for sensor L is saved to external static ram buffer SAMPLES_L. The AIC device is then told via the serial interface to switch to the sensor R at the same 19.2 kHz sampling rate. The incoming data words are ignored by DSP chip 23 until encoder position 8 is detected. The data word is then fetched from the serial port receive register, normalized as described above, and stored in external static ram buffer SAMPLES R. The AIC is then told by the DSP chip to switch sensors again so that the second sample of sensor L can be fetched when encoder position 16 is detected ... and so on. Sixty-four (64) interleaved (L, R) samples are taken by the circuitry of FIG. 3 in this manner for eight (8) revolutions of the wheel/tire assembly—resulting in two non-interleaved sample buffers in static ram 33 of 256 rpm-normalized samples each. The 1/32 revolution offset between the L and R sensors' samples is readily compensated for by DSP chip 23.

Since the incoming sample words are asynchronous to the occurrences of the quadrature signal edges which signal the taking of a sample, a sample timing error can occur which has a maximum error of 1/19.2 kHz, or 0.000052 sec. This error is well below the threshold of any affect on the system performance. It has also been shown by testing that sample errors from this method are random and thus this relatively high frequency noise is easily removed by the Discrete Fourier Transform (DFT), described below. Other methods of analog signal acquisition could certainly be used with the present invention, even those which obtain instantaneous samples of both channels triggered directly off the encoder edges. However, the AIC chip is preferred for this purpose because of its price/performance ratio and its compatibility with the DSP serial interface, requireing no additional parts for communications.

Although the signals from sensors "L" and "R" contain many frequencies, the frequency of interest is that corresponding to the rotational speed of spindle 13 during the test. To extract this component of the signal, a Hamming-windowed 256 point Discrete Fourier Transform is performed by DSP chip 23 upon each sample array after all data has been acquired, normalized for rpm, and stored into static RAM. This gives rectangular coordinates (real "x" and imaginary "y" outputs) for the running speed forces due to imbalance at each sensor. The samples of sensor L are retrieved from static RAM and are then multiplied by Hamming window coefficients (also retrieved from a static RAM buffer) to improve the spectral resolution of the DFT, and are then copied back into the external static RAM into a windowed-sample buffer for sensor L. The process is repeated for sensor R using the same Hamming coefficients buffer. The original sample arrays are thus preserved for further analysis when in diagnostics mode, or even for downloading to a hard disk drive using an in-circuit-emulator tool in a lab environment.

The windowed-DFT method of extracting a particular frequency sinusoid from a signal containing many is well known. That method was developed in the early 1800s. The fast implementation of a DFT performed over discrete intervals, or the FFT, was thought of as early as 1903, and then rediscovered and implemented in 1965 in part because of the availability of computers. For insight into the DFT refer to: "DIGITAL SIGNAL PROCESSING IN VLSI" by Analog Devices, Prentice Hall 1990; "AN INTRODUCTION TO LINEAR ANALYSIS" by Kreider, Kuller, Ostberg, and Perkins, Addison Wesley 1966 or most college level differential equations texts.

In this regard, U.S. Pat. Re. 31,971 (originally 4,285,240) to Gold discloses the use of the DFT in automotive wheel balancers by storing lookup tables of the sin and cosine factors used in the DFT. The present invention provides even better performance. The execution speed of the DSP chip allows calculation of the sin and cosine factors (used in performing the DFT) on-the-fly, and thus the program does not need to store the lookup tables, which requires considerable amounts of memory. The sin function used by the present invention is a well known 5th order polynomial expansion for sin(x) where 0<x<90 degrees:

sin(x)=3.140625x+0.0202637x2 −5.325196x3
+0.5446778x4+1.800293x5.

The cos(x) function is simply implemented as sin(90-x).

For an explanation of these functions and for obtaining cos(x) and sin(x) values for angles other than 0–90 degrees, refer to "DIGITAL SIGNAL PROCESSING APPLICATIONS USING THE ADSP-2100 FAMILY" by Analog Devices, Prentice Hall, 1990.

Although the mechanical structure of FIGS. 1 & 2 and the electronic circuitry of FIG. 3 result in a satisfactory balancer 11, it is the general operation of the software program which governs the operation of DSP chip 23 which provides truly superior performance. That software operation is based on a series of assumptions about balancer 11 itself. These assumptions are:

1. The spindle/wheel/tire assembly is a rigid body.
2. The imbalance of the spindle/wheel/tire assembly can be modeled as:
   a) a force imbalance in a specific plane and at a specific radial angle which is normal to the axis of rotation; and
   b) a couple imbalance at a specific radial angle which is normal to the axis of rotation.
3. A force measurement system is present which constrains the movement of the axis of rotation of the spindle/wheel/tire assembly and measures the forces produced by the imbalance.
4. If the spindle has only force imbalance or only couple imbalance, then the magnitudes of the force transducers' signals are proportional to the magnitude of the force or couple imbalance, given that all other parameters remain constant.
5. If the spindle has only force imbalance or only couple imbalance, a change in the radial angle of the imbalance produces an identical change in the phase angle of the force transducers' signals, given that all other parameters remain constant.
6. Superposition applies, which means the transducers' signals produced when multiple imbalance masses are present simultaneously are the vector sums of the transducers' signals produced with the same imbalance masses present individually.
7. The spindle/wheel/tire assembly can be balanced by placing a balance weight in each of any two planes which are normal to the axis of rotation. Once the imbalance has been modeled, the masses of the weights and their locations in cylindrical coordinates can be computed from the imbalance model using ordinary statics based on summations of forces and moments.

To understand the method of the present invention, it is necessary to understand not only the assumptions, but also the following nomenclature. Each force sensor, "L" and "R" produces a signal for a given spin which can be expressed in polar or rectangular form. In general, these are described as:

$L>$ = transducer L, vector
$R>$ = transducer R, vector

These can be expressed in polar form as:

$Lm$ = transducer L, magnitude
$Lp$ = transducer L, phase
$Rm$ = transducer R, magnitude
$Rp$ = transducer R, phase or in rectangular form as:

$Lx$ = transducer L, x component
$Ly$ = transducer L, y component
$Rx$ = transducer R, x component
$Ry$ = transducer R, y component The final suffix applied to these labels is one of the following:
$>$ means "vector"
x means "x component" or "real component"
y means "y component" or "imaginary component"
m means "magnitude"
p means "phase"

Qualifiers, which might appear before the final suffix, are:
a means "adjusted"
b means "bare"
s means "static"
c means "couple"
c1 means "calibration spin 1"
c2 means "calibration spin 2"
c3 means "calibration spin 3"
t means "temporary"
e means "estimated"
u means "unscaled".

The force transducer polarity is chosen such that relative compression produces a positive signal while relative tension produces a negative signal.

Measurements are made using right-handed cartesian and cylindrical coordinate systems. The coordinates are:

(x, y, z) = coordinates of point in cartesian coordinates (M, P, Z) = coordinates of point in cylindrical coordinates. The transforms from cartesian to cylindrical coordinates are:

$$M = \text{sqrt}(x^{}2 + y^{}2) \quad (1)$$
$$P = \arctan2(y, x) \quad (2)$$
$$Z = z \quad (3)$$

The transforms from cylindrical to cartesian coordinates are:

$$x = M \cos P \quad (4)$$
$$y = M \sin P \quad (5)$$
$$z = Z \quad (6)$$

A cylindrical coordinate system is used in which the the physical coordinate system is referenced to the horizontal plane containing the spindle 13 and the force transducers 19, 21. Its reference position for the P coordinate is a horizontal line extending from the spindle out the front of the assembly. The method of the present invention uses an approximate model for the plane separation for balancer 11. The approximate model is essentially the same as the method presented by the American Society of Tool Engineers in the "Tool Engineers Handbook, Second Edition" written by Werner I Senger This method was developed for use on "soft bearing" balancers (where the resonant frequency of the structure was below the shaft running frequency), but it has been found to work well with "hard bearing" balancers having fixed sensors and work support locations.

In this model the calibration static imbalance is modeled as a force vector $S>$ applied at the origin, while the calibration couple imbalance is modeled as the couple vector $C>$, as shown in FIG. 4. The forces produced by this imbalance are measured by the force transducers "L" 19 and "R" 21.

For this model four approximate calibration coefficients are required:
Ks = plane separation, static
Kc = plane separation, couple
Gs = transducer gain constant, static
Gc = transducer gain constant, couple.

The model uses the following two equations:

$$S> = Gs * (R> - Ks * L>) \quad (7)$$

$$C> = Gc * (R> - Kc * L>) \quad (8)$$

where:
$S>$ = the estimated static imbalance
$C>$ = the estimated couple imbalance Note in these models that a force $S>$ with a phase of zero produces relative tension, and therefore negative signals, in the force transducers. A couple $C>$ with a phase of zero also produces relative tension, and therefore negative signals.

Figure 5:
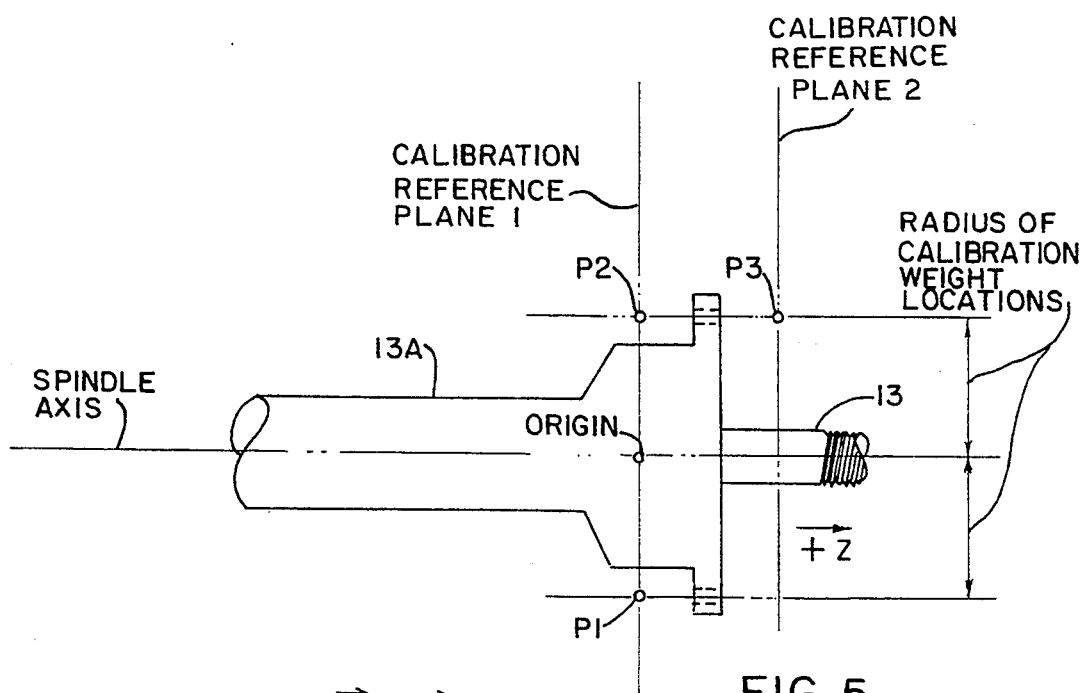
FIG. 5 is a simplified plan view illustrating calibration of the wheel balancer of FIG. 1 or FIG. 2.

The spindle can be modeled for calibration purposes as shown in FIG. 5. In this model calibration reference plane 1 is defined in the physical coordinate system as being normal to the z-axis and containing the origin of the coordinate systems. Calibration reference plane 2 is defined in the physical coordinate system as being normal to the z-axis a defined distance in the +z direction from the origin.

The "calibration position 1", labeled P1 in FIG. 5, is in calibration reference plane 1 at cylindrical coordinates (Mc, pi, 0) The "calibration position 2" labeled P2 in FIG. 5, is in calibration reference plane 1 at cylindrical coordinates (Mc, 0, 0) The "calibration position 3", labeled P3 in FIG. 5, is in calibration reference plane 2 at cylindrical coordinates (Mc, 0, Zc).

The radius at which these positions are located is, for example, 3,242" or 82.35 mm.

Three spins are required to calibrate the system. This is the optimum procedure for performing calibration because only a single calibration weight is required. A calibration weight having a mass of 275 gm works satisfactorily to calibrate the system. Those spins are as follows:

Calibration Spin 1 - A calibration weight of defined mass is placed at position P1 on the bare spindle. Measured are:
$Lc1> =$ transducer L, calibration spin 1
$Rc1> =$ transducer R, calibration spin 1

Calibration Spin 2 - A calibration weight of defined mass is placed at position P2 on the bare spindle. Measured are:
$Lc2> =$ transducer L, calibration spin 2
$Rc2> =$ transducer R, calibration spin 2

Calibration Spin 3 - A calibration weight of defined mass is placed at position P3 on the bare spindle. Measured are:
$Lc3> =$ transducer L, calibration spin 3
$Rc3> =$ transducer R, calibration spin 3

From these three calibration spins, the following are computed by DSP chip 23:
1) the signals that represent the residual imbalance of the bare spindle;
2) the signals that represent the calibration static imbalance;
3) the signals that represent the calibration couple imbalance;
4) the electrical phase shifts of the transducers; and
5) the calibration coefficients of the plane separation approximate model.

Note that none of these calculations requires any measurement or knowledge of transducer positions, or of the structure of the balancer which couples the transducers to the spindle 13.

As discussed above, the residual imbalance of spindle 13 affects the output signals of transducers "L" and "R." However, this residual imbalance is determined during calibration and is thereafter compensated for by DSP chip 23. Determination of the residual imbalance is as follows: The "residual imbalance" of the bare spindle affects the measurements made during all three calibration spins. The signals measured during calibration spin are the vector sums of the signals due to the calibration weight and the signals due to the residual imbalance of the bare spindle.

The signals measured during calibration spin 2 are the vector sums of the signals due to the calibration weight and the signals due to the residual imbalance of the bare spindle. And, the signals measured during calibration spin 3 are the vector sums of the signals due to the calibration weight and the signals due to the residual imbalance of the bare spindle.

The signals due solely to the calibration weight of calibration spin 1 are the vector opposites of the signals due solely to the calibration weight of calibration spin 2. If the signals measured during calibration spin 1 are vectorially added to the signals of calibration spin 2, the signals due to the calibration weights cancel while the signals due to the residual imbalance of the bare spindle add. This follows the principle of superposition.

Thus, the signals representing the residual imbalance of the bare spindle are computed by DSP chip 23 as follows:

$Lb> =$ transducer L, residual imbalance
$$Lb> = (Lc1> + Lc2>) / 2 \quad (9)$$
$Rb> =$ transducer R, residual imbalance
$$Rb> = (Rc1> + Rc2>) / 2 \quad (10)$$

In rectangular form:
$$Lbx = (Lc1x + Lc2x) / 2 \quad (11)$$
$$Lby = (Lc1y + Lc2y) / 2 \quad (12)$$
$$Rbx = (Rc1x + Rc2x) / 2 \quad (13)$$
$$Rby = (Rc1y + Rc2y) / 2 \quad (14)$$

These computed signals representing the residual imbalance of the bare spindle are stored by DSP chip 23, and then are vectorially subtracted from the measurements of all spins. This "compensates" these spins for the residual imbalance of the spindle, producing the signals that would be measured if the spindle were perfectly balanced, but saving the manufacturing costs associated with balancing the spindle.

Note also that this residual imbalance determining procedure can be performed using any number of spins, each with a single calibration weight applied. The weight positions would have the same axial location, and would be uniformly spaced angularly. The signals of these spins would be summed, and then divided by the number of spins performed.

Although it is more complicated and thus less desirable, the spins can even be performed with different weight amounts and locations for each spin. This requires that the signals be scaled in magnitude as they are summed, such that the effects of the calibration weights cancel, thereby leaving only the effects of the residual imbalance.

An alternative procedure to the three calibration spin procedure described above is slightly different. It also has three spins, as follows: In the first spin, spindle 13 is bare; it has no calibration weight attached. In the second, the spindle is spun with a calibration weight at position P2. In the third, the spindle is spun with a calibration weight at position P3. This alternative procedure provides residual spindle imbalance data directly (from spin 1). It also provides static calibration imbalance data directly (from spin 2). Couple calibration imbalance data is calculated by DSP chip 23 in this method by vectorially subtracting the data of spin 2 from that of spin 3.

The first procedure described has certain disadvantages when compared with the alternative procedure. The first requires that two holes be drilled in the flange of the spindle for mounting calibration weights. These holes must be drilled same radius and must be diametrically opposite the axis of rotation of the spindle. To the extent that they are not, spins 1 and 2 produce slight errors in the measurement of the residual imbalance, since the forces due to the calibration weights in these two positions do not precisely cancel. The precision in location of these holes thus defines a limit on the accuracy of the balancer.

Secondly, the first procedure requires mounting a calibration weight three times instead of two.

The alternative procedure avoids these difficulties. Its only precise requirement is that the hole for mounting the calibration weight be located at a precise radius from the axis of rotation of the spindle. To the extent it is not, it affects only the magnitude of the computation of the imbalance, but not the ability to compensate for an unbalanced spindle, since that unbalance is precisely measured.

In addition to providing residual imbalance data, the three calibration spins (from either procedure) provide the necessary data for computing the static and couple calibration signals.

The "static calibration" is the amount of pure static imbalance which is mounted on the spindle during the calibration procedure. This static calibration, labeled "Scal" is defined as a known mass at calibration position 2, which is in calibration plane 1 at a known radius. This mass thus produces a static force when the spindle rotates. The units of Scal are, for example, gm * mm. The static calibration signals are those signals that would be measured with a static calibration imbalance mounted on the spindle.

The "couple calibration" is the amount of pure couple imbalance which is mounted on the spindle during the calibration procedure. This couple calibration, labeled "Ccal" is defined as a known mass at calibration position 1, which is in calibration plane 1 at a known radius, along with a known mass at calibration position 3, which is in calibration plane 2 at a known radius, with a known distance separating these two calibration planes. These two masses thus produce a couple force when the spindle rotates. The units of Ccal are, for example, gm * mm * mm. The couple calibration signals are those signals that would be measured with a couple calibration imbalance mounted on the spindle.

The static calibration signals are computed by vectorially subtracting the computed residual spindle imbalance from the measurements of calibration spin 2:

$$Ls> = \text{transducer } L, \text{ static calibration} \quad (15)$$
$$= Lc2> - Lb>$$

$$Rs> = \text{transducer } R, \text{ static calibration} \quad (16)$$
$$= Rc2> - Rb>$$

In rectangular form:
$$Lsx = Lc2x - Lbx \quad (17)$$
$$Lsy = Lc2y - Lby \quad (18)$$
$$Rsx = Rc2x - Rbx \quad (19)$$
$$Rsy = Rc2y - Rby \quad (20)$$

These represent the signals that would be directly measured by a spin of a perfectly balanced spindle with the static calibration mass mounted, since calibration spin 2 mounts a calibration weight which constitutes the static calibration imbalance.

The couple calibration signals are computed by vectorially subtracting the computed residual spindle imbalance from the measurements of calibration spins 1 and 3, then vectorially adding the results:

$$Ls> = \text{transducer } L, \text{ couple calibration} \quad (21)$$
$$= (Lc1> - Lb>) + (Lc3> - LB>)$$

$$Rs> = \text{transducer } R, \text{ couple calibration} \quad (22)$$
$$= (Rc1> - Rb>) + (Rc3> - Rb>)$$

In rectangular form:
$$Lcx = (Lc1x - Lbx) + (Lc3x - Lbx) \quad (23)$$
$$Lcy = (Lc1y - Lby) + (Lc3y - Lby) \quad (24)$$
$$Rcx = (Rc1x - Rbx) + (Rc3x - Rbx) \quad (25)$$
$$Rcy = (Rc1y - Rby) + (Rc3y - Rby) \quad (26)$$

These represent the signals that would be directly measured by a spin of a perfectly balanced spindle with the couple calibration masses mounted, since calibration spins 1 and 3 together mount calibration weights which constitute the couple calibration imbalance.

In addition to the compensation for residual spindle imbalance, it is also necessary to compensate for transducer phase shifts. There are phase differences between the physical coordinate system and the transducer signals. This is caused by electronic phase shifts in the force transducers and the signal processing circuits and filters.

The computed static calibration signals ideally should have a phase shift of 180 degrees. Thus the phase differences between these computed signals and 180 degrees are used to phase adjust the computed static and couple imbalance signals, as well as the signals measured during the normal balancing procedure. These phase adjust values are:
Lp = transducer L, phase adjust
Rp = transducer R, phase adjust The transducer phase adjust angles are computed by converting the computed static calibration signals to polar form, then using their angles as follows:
$$Lp = Lsp + 180 \text{ degrees} \quad (27)$$
$$Rp = Rsp + 180 \text{ degrees} \quad (28)$$

The computed static and couple calibration signals are phase adjusted by converting them to polar form, subtracting the phase compensation angles from their angles, then converting them back to rectangular form. The phase adjustments are:

$$Lsap = \text{left transducer, static calibration, adjusted, phase} \quad (29)$$
$$= Lsp - Lp$$

$$Rsap = \text{right transducer, static calibration, adjusted, phase} \quad (30)$$
$$= Rsp - Rp$$

$$Lcap = \text{left transducer, couple calibration, adjusted, phase} \quad (31)$$
$$= Lcp - Lp$$

$$Rcap = \text{right transducer, couple calibration, adjusted, phase} \quad (32)$$
$$= Rcp - Rp$$

Note that this produces a phase for the computed static calibration signals of 180 degrees. Ideally, this is also the case for the computed couple calibration signals.

The results of the calibration procedure are used to compute the calibration coefficients Ks, Kc, Gs, and Gc. The computed static calibration signals are applied to equations (7) and (8):
$$S> = Scal> = Gs * (Ras> - Ks * Las>) \quad (33)$$
$$C> = 0> = Gc * (Ras> - Kc * Las>) \quad (34)$$
Similarly, the computed couple calibration signals are applied to equations (7) and (8):

$$S> = 0> = Gs * (Rac> - Ks * Lac>) \quad (35)$$
$$C> = Ccal> = Gc * (Rac> - Kc * Lac>) \quad (36)$$

The model is an approximation only. It is assumed that the imaginary component of all vectors in equations (33) through (36) are zero. These vector equations thus reduce to scalar equations. Note that the algebraic signs of the signals thus determine the algebraic signs of Ks, Kc, Gs, and Gc.

From equation (34), if (C=0), then (Rsax - Kc * Lsax)=0. Solving for Kc produces:

$$Kc = \frac{Rsax}{Lsax} \quad (37)$$

From equation (35), if (S=0), then (Rcax - Ks * Lcax)=0. Solving for Ks produces:

$$Ks = \frac{Rcax}{Lcax} \quad (38)$$

Solving equation (36) for Gc:

$$Gc = \frac{Ccal}{Rcax - Kc * Lcax} \quad (39)$$

Solving equation (33) for Gs:

$$Gs = \frac{Scal}{Rsax - Ks * Lsax} \quad (40)$$

A significant advantage of this procedure is that the computations of the calibration coefficients depend only on computations made from signals which are measured during the calibration procedure, and on knowledge of the static and couple calibration imbalances which were mounted on the spindle during the calibration procedure, and do not depend on any knowledge of the dimensions and structure of the balancer hardware.

DSP chip 23 stores the following calibration values for later use during an imbalance measurement procedure:

computed transducer phase shift compensation
Lp
Rp
computed transducer data for bare spindle imbalance compensation:
Lbx=transducer L, bare spindle, x component
Lby=transducer L, bare spindle, y component
Rbx=transducer R, bare spindle, x component
Rby=transducer R, bare spindle, y component
computed transducer data for static calibration
Lsx=transducer L, static calibration, x component
Lsy=transducer L, static calibration, y component
Rsx=transducer R, static calibration, x component
Rsy=transducer R, static calibration, y component
computed transducer data for couple calibration
Lcx=transducer L, couple calibration, x component
Lcy=transducer L, couple calibration, y component
Rcx=transducer R, couple calibration, x component
Rcy=transducer R, couple calibration, y component
calibration coefficients
Ks=plane separation, static
Kc=plane separation, couple
Gs=transducer gain constant, static
Gc=transducer gain constant, couple After these values are stored, balancer 11 is ready to measure imbalance of a wheel/tire assembly 17. The wheel/tire assembly is mounted on the spindle 13, spun up, and the transducer signals are measured and recorded as described above in connection with FIG. 3. These signals are:
L>=transducer L
R>=transducer R These signals are compensated for the residual imbalance of the bare spindle and then phase adjusted for the computed phase offsets of the transducers themselves, using the following procedure:

1) Measure the signals in rectangular form.
2) In rectangular form, subtract the Lb> and Rb> computed residual imbalance signals from the signals.
3) Convert the results to polar form.
4) In polar form, subtract the Lp and Rp phase compensation angles from the signal angles.
5) Convert the results to rectangular form.

This produces the "adjusted" signals for the transducers:
La>=transducer L, phase and residual imbalance adjusted
Ra>=transducer R, phase and residual imbalance adjusted Note that phase adjusting these signals also compensates for the 1/64 revolution offset between samples of the sensor L and sensor R.

Next, the residual imbalance and phase compensated transducer measurements are applied to equations (7) and (8) to approximately compute the imbalance as a static imbalance and a couple imbalance, which are applied at the same locations as the known calibration static and couple imbalances:

$$S> = Gs * (Ra> - Ks * La>) \quad (41)$$
$$C> = Gc * (Ra> - Kc * La>) \quad (42)$$

The static and couple imbalance computed by equations (41) and (42) are only estimates. They are not sufficiently accurate to produce a quality balancer. The estimates are refined by an iterative process which produce an extremely accurate estimate of the imbalance.

According to the initial assumptions, if the calibration static imbalance is scaled in magnitude and adjusted in phase such that it equals the estimate of the static imbalance, the computed transducer signals corresponding to the static calibration are scaled in magnitude by the same scale factor and adjusted in phase by the same phase adjustment. Similarly, if the calibration couple imbalance is scaled in magnitude and adjusted in phase such that it equals the estimate of the couple imbalance, the computed transducer signals corresponding to the couple calibration are scaled in magnitude by the same scale factor and adjusted in phase by the same phase adjustment.

If these scaling and phase adjustment computations are performed and the results are added, the resulting signal estimates should equal the actual compensated and phase adjusted signals measured during the imbalance spin. If they do not, the estimate of the imbalance is incorrect, and the differences between the estimated signals and the actual signals are used to refine the estimate of the imbalance. The process is iterated until the differences are sufficiently small, in which case the final estimate of the imbalances is highly accurate.

The computation procedure is as follows:

1) Prepare "temporary" signals from which the imbalance is estimated. Initially, these signals equal the compensated and phase adjusted signals measured during the imbalance spin:
   Ltx=Lax
   Lty=Lay
   Rtx=Rax
   Rty=Ray
2) Estimate the imbalance from the temporary signals using the approximate calibration model:
   Sx=Gs * (Rtx - Ks * Ltx)       (43)
   Sy=Gs * (Rty - Ks * Lty)       (44)
   Cx=Gc * (Rtx - Kc * Ltx)       (45)
   Cy=Gc * (Rty - Kc * Lty)       (46)
3) Convert the imbalance estimates to polar form, obtaining:
   Sm
   Sp
   Cm
   Cp
4) Estimate the signals from the estimates of the imbalance:

$$Lex = Lsm \frac{Sm}{Scal} \cos(Lsap + Sp) + Lcm \frac{Cm}{Ccal} \cos(Lcap + Cp) \quad (47)$$

$$Ley = Lsm \frac{Sm}{Scal} \sin(Lcap + Sp) + Lcm \frac{Cm}{Ccal} \sin(Lcap + Cp) \quad (48)$$

$$Rex = Rsm \frac{Sm}{Scal} \cos(Rsap + Sp) + Rcm \frac{Cm}{Ccal} \cos(Rcap + Cp) \quad (49)$$

$$Rey = Rsm \frac{Sm}{Scal} \sin(Rcap + Sp) + Rcm \frac{Cm}{Ccal} \sin(Rcap + Cp) \quad (50)$$

5) Compare the estimated signals to the measured signals. If the differences are small enough, accept the estimate of the imbalance. If they are not small enough, add half the differences to the temporary signals, and try again. This is represented by the following pseudo-code fragment:
   t=maximum allowed differences between signals
   if
       (abs (Lex - Lax)>t or abs(Ley - Lay)>t or abs(Rex - Rax)>t or abs(Rey - Ray)>t )
   then
       Ltx=Ltx+(Lax - Lex) / 2
       Lty=Lty+(Lay - Ley) / 2
       Rtx=Rtx+(Rax - Rex) / 2
       Rty=Rty+(Ray - Rey) / 2
   go to step 2
   else
       accept the estimate of the imbalance Equation (47) can be explained in plain language as: "An estimate of the x component of the left sensor (Lex) equals the magnitude of the static calibration signal of the L sensor (Lsm) scaled by multiplying by the ratio of the estimated static imbalance magnitude to the static calibration magnitude (Sm / Scal) and converted to an x component by multiplying by the cosine of the phase angle of the estimated static imbalance (Lsap+Sp), to which is added the magnitude of the couple calibration signal of the L sensor (Lcm) scaled by multiplying by the ratio of the estimated couple imbalance magnitude to the couple calibration magnitude (Cm / Ccal) and converted to an x component by multiplying by the cosine of the phase angle of the estimated couple imbalance (Lcap+Cp)." This embodies the assumptions listed at the beginning of this disclosure, in that a signal measured during calibration is scaled in magnitude by the ratio of the magnitude of the estimate imbalance to the calibration imbalance, and phase adjusted by the difference in phase of the estimated imbalance relative to the calibration imbalance, and in that these scaled and phase adjusted signals are summed according to the principle of superposition.

Equations (48) through (51) similarly compute the y component of the L sensor, as well as the x and y components of the R sensor.

The equations (48) through (51) constitute a tremendous advance in the art of balancing a rotating object. These equations do not compute the imbalance, rather they compute estimates of the signals the computed imbalance would be expected to measure. If these estimated signals match the signals actually measured, then the estimate of the imbalance must be correct. If these estimated signals do not match the signals actually measured to sufficient accuracy, the estimate of the imbalance is refined by an iterative process.

Note that these equations do not require any knowledge of the structure of the balancer; they require only the following:
   a) the values of known static and couple calibration imbalances,
   b) the signal values corresponding to known static and couple calibration imbalances, and
   c) the signal values corresponding to an unknown imbalance.

Figure 6:
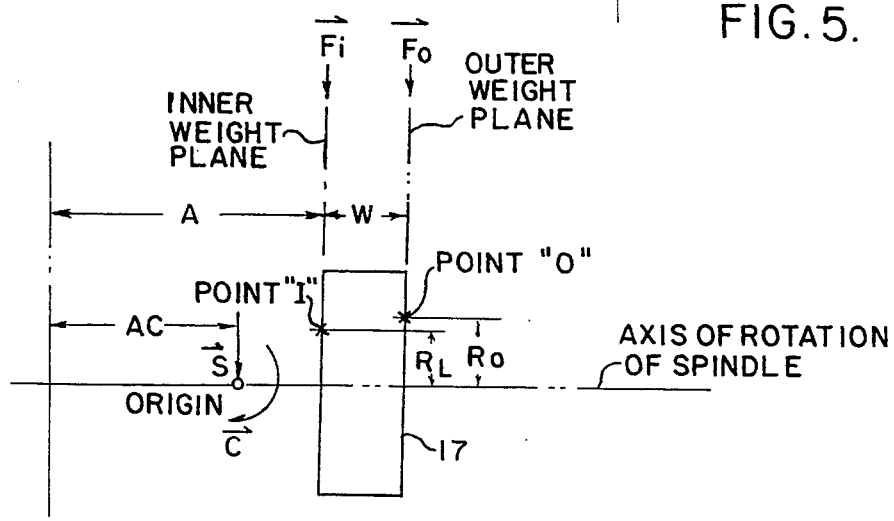
FIG. 6 is a simplified plan view illustrating wheel balancing using the wheel balancer of FIG. 1 or FIG. 2.

The spindle/wheel/tire can be modeled for balancing purposes as shown in FIG. 6, where
   A=distance measured to inner weight plane of wheel
   W=width between weight planes of wheel
   AC=distance from reference plane of A to origin of coordinate systems
   Ri=radius of position of inner weight
   Ro=radius of position of outer weight
   S>=static imbalance applied at the origin
   C>=couple imbalance applied at the origin The wheel/tire assembly can be balanced by placing a "balancing" weight at point "I" on the inner plane and another weight at point "0" on the outer plane. These are:
   Wo>=weight, outer
   Wi>=weight, inner
The weights are to be applied along the rim of the wheel at a particular angular location. The forces produced on the spinning spindle by the balance weights are found by:
   f=m * r * w**2                              (51)
where
   f=force on spindle
   m=mass of imbalance weight
   r=radius of imbalance weight
   w=angular velocity
These forces are "normalized" to the actual angular velocity of the spinning spindle, and thus the "w" term is ignored. Thus the forces produced by the balance weight are represented by:
   Fi>=Ri * Wi>                                (52)
   Fo>=Ro * Wo>                                (53)
where
   Fi=force due to inner weight
   Of=force due to outer weight
   Wi=inner weight
   Wo=outer weight
   Ri=radius of inner weight
   Ro=radius of outer weight These weights must produce the same static imbalance as the measured static imbalance, which is applied at the origin, and the same couple imbalance as the measured couple imbalance. These are computed by a force balance normal to the axis of rotation, and a moment balance about the origin:

$$S> = Ri * Wi> + Ro * Wo> \quad (54)$$
$$C> = (A - AC) * Ri * Wi> + (A - AC + W) * Ro * Wo> \quad (55)$$

Solving for $Wi>$ and $Wo>$:

$$\begin{aligned} C> &= (A - Ac) * (S> - Ro * Wo>) + \\ &\quad (A - AC + W) * Ro * Wo> \\ &= (A - Ac) * S> + \\ &\quad (A - AC + W - A + AC) * Ro * Wo> \\ &= (A - AC) * S> + W * Ro * Wo> \end{aligned} \quad (56)$$

$$Wo> = \frac{C> - (A - AC) * S>}{W * Ro} \quad (57)$$

$$\begin{aligned} C> &= (A - AC) * Ri * Wi> + \\ &\quad (A - AC + W) * (S> - Ri * Wi>) \\ &= (A - AC + W) * S> + \\ &\quad (A - AC - W - A + AC) * Ri * Wi> \\ &= (A - AC + W) * S> - W * Ri * Wi> \end{aligned} \quad (58)$$

$$Wi> = \frac{(A - AC + W) * S> - C>}{W * Ri} \quad (59)$$

In rectangular form, the computations are:

Wox = (cx - (A - AC) * Sx) / (W * Ro)  (60)
Woy = (Cy - (A - AC) * Sy) / (W * Ro)  (61)
Wix = (A - AC+W) * Sx - CX) / (W * Ri)  (62)
Wiy = (A - AC+W) * Sy - Cy) / (W * Ri)  (63)

These are converted to polar form for use as amount and position indications to the user on display 25 in a manner which is well known and widely practice in the art.

In view of the above it will be seen that the objects and features of the present invention are achieved and other advantageous results obtained. It is not intended that the present invention be limited by the specification and drawings, which are merely illustrative, but only by the appended claims.

What is claimed is:

1. A method of operating a wheel balancer, said balancer having a spindle for mounting a wheel/tire assembly thereon, means for spinning said spindle about an axis, and at least two sensors for sensing imbalance forces, said method comprising;

spinning said spindle about said axis for three calibration spins, each calibration spin comprising a plurality of revolutions of said spindle;

sensing imbalance forces due to known calibration imbalances;

determining a set of calibration coefficients for said wheel balancer from said sensed imbalance forces and from knowledge of said known calibration imbalances; and storing said set of calibration coefficients in an electronic memory for subsequent use in balancing a wheel/tire assembly;

wherein during the calibration spins a predetermined weight is removably disposed at a first predetermined location on the spindle during one of the calibration spins, a predetermined weight being removably disposed at a second predetermined location on the spindle during a second of the calibration spins, and a predetermined weight being removably disposed at a third predetermined location on the spindle during a third of the calibration spins.

2. The method as set forth in claim 1 wherein two of said first, second and third predetermined locations are disposed in a first plane normal to the longitudinal axis of the spindle and the other predetermined location is disposed outside said plane.

3. The method as set forth in claim 2 including the step of calculating residual spindle imbalance data from the two calibration spins in which the predetermined weights were disposed in said first plane normal to the longitudinal axis of the spindle.

4. The method as set forth in claim 3 wherein the step of calculating residual spindle imbalance data includes taking the vector averages of imbalance force data from said sensors acquired in said two calibration spins in which the predetermined weights were disposed in said first plane.

5. The method as set forth in claim 4 further including storing in electronic memory the residual spindle imbalance data, and compensating subsequent sensor output signals to take into account the residual spindle imbalance.

6. The method as set forth in claim 5 wherein the step of compensating for residual spindle imbalance includes vectorially subtracting the residual spindle imbalance data from vector representations of the output signals of the two sensors.

7. The method as set forth in claim 2 including the step of calculating calibration couple imbalance data for each sensor from the sensor output signals obtained during a calibration spin taken with a predetermined weight in the first plane and a calibration spin taken with a predetermined weight outside the first plane.

8. The method as set forth in claim 7 wherein calculation of the calibration couple imbalance data includes vectorially adding the sensor outputs taken during said calibration spin with a predetermined weight in the first plane and during said calibration spin with a predetermined weight outside the first plane.

9. The method as set forth in claim 7 including the step of storing the calibration couple imbalance data for the wheel balancer in electronic memory.

10. The method as set forth in claim 7 further including the step of compensating the calibration couple imbalance data for residual spindle imbalance.

11. The method as set forth in claim 2 further including the step of obtaining static calibration imbalance data from the sensor output signals acquired during at least one of the calibration spins and storing static calibration imbalance data in electronic memory.

12. The method as set forth in claim 11 further including the step of compensating the static calibration imbalance data for residual spindle imbalance by vectorially subtracting residual spindle imbalance data from the static calibration imbalance data.

13. The method as set forth in claim 1 wherein the predetermined weights all have the same mass.

14. The method as set forth in claim 13 wherein there are more than three calibration spins, a plurality of said spins having a single calibration weight applied to the spindle in the same plane normal to the longitudinal axis of the spindle, said weight being placed at predetermined angular positions in said plane which are uniformly spaced around the spindle.

15. The method as set forth in claim 1 wherein at least one of the predetermined weights has a different mass than that of one of the other predetermined weights.

16. A method of operating a wheel balancer, said balancer having a spindle for mounting a wheel/tire assembly thereon, means for spinning said spindle about an axis, and at least two sensors for sensing imbalance forces, said method comprising;
spinning said spindle about said axis for three calibration spins, each calibration spin comprising a plurality of revolutions of said spindle;
sensing imbalance forces due to known calibration imbalances;
determining a set of calibration coefficients for said wheel balancer from said sensed imbalance forces and from knowledge of said known calibration imbalances; and
storing said set of calibration coefficients in an electronic memory for subsequent use in balancing a wheel/tire assembly;
wherein residual spindle imbalance data is obtained from sensor output signals from two of the three calibration spins.

17. A method of operating a wheel balancer, said balancer having a spindle for mounting a wheel/tire assembly thereon, means for spinning said spindle about an axis, and at least two sensors for sensing imbalance forces, said method comprising;
spinning said spindle about said axis for three calibration spins, each calibration spin comprising a plurality of revolutions of said spindle;
sensing imbalance forces due to known calibration imbalances;
determining a set of calibration coefficients for said wheel balancer from said sensed imbalance forces and from knowledge of said known calibration imbalances; and
storing said set of calibration coefficients in an electronic memory for subsequent use in balancing a wheel/tire assembly;
wherein residual spindle imbalance data is obtained from sensor output signals from a single calibration spin.

18. The method as set forth in claim 17 wherein the calibration spins include one spin in which a predetermined weight is removably disposed in a first plane normal to the longitudinal axis of the spindle and a second spin in which a predetermined weight is removably disposed in a second plane normal to the longitudinal axis of the spindle.

19. A method of operating a wheel balancer, said balancer having a spindle for mounting a wheel/tire assembly thereon, means for spinning said spindle about an axis, and at least two sensors for sensing imbalance forces, said method comprising;
spinning said spindle about said axis a plurality of times;
sensing imbalance forces due to known calibration imbalances;
determining a set of calibration coefficients for said wheel balancer from said sensed imbalance forces and from knowledge of said known calibration imbalances; and
storing said set of calibration coefficients in an electronic memory for subsequent use in balancing a wheel/tire assembly;
wherein the calibration coefficients are determined independently of any knowledge of the geometric relationships between the sensors and the rest of the balancer.

20. A method of operating a wheel balancer, said balancer having a spindle for mounting a wheel/tire assembly thereon, means for spinning said spindle about an axis, and at least two sensors for sensing imbalance forces, said method comprising:
spinning said spindle about said axis a plurality of calibration spins, each calibration spin comprising a plurality of revolutions of said spindle, at least two of the calibration spins being performed with known calibration imbalances secured to the spindle, the known calibration imbalances differing between said at least two calibration spins;
sensing imbalance forces due to said known calibration imbalances;
determining a set of calibration coefficients for said wheel balancer from said sensed imbalance forces and from knowledge of said known calibration imbalances;
storing said set of calibration coefficients and additional calibration data in an electronic memory for subsequent use in balancing a wheel/tire assembly;
spinning a wheel/tire assembly mounted on the spindle;
measuring and recording the corresponding output signals from said at least two sensors; and
prior to adding any balance weights to the wheel/tire assembly to correct any imbalance thereof, iteratively determining the actual imbalance of the wheel/tire assembly using the stored calibration coefficients, the stored additional calibration data, and the measured sensor output signals corresponding to the spin of the mounted wheel/tire assembly.

21. A method of operating a wheel balancer, said balancer having a spindle for mounting a wheel/tire assembly thereon, means for spinning said spindle about an axis, and at least two sensors for sensing imbalance forces, said method comprising;
spinning said spindle about said axis a plurality of times;
sensing imbalance forces due to known calibration imbalances;
determining a set of calibration coefficients for said wheel balancer from said sensed imbalance forces and from knowledge of said known calibration imbalances;

storing said set of calibration coefficients and additional calibration data in an electronic memory for subsequent use in balancing a wheel/tire assembly; and spinning a wheel/tire assembly mounted on the spindle, measuring and recording the corresponding output signals from said at least two sensors, and, prior to adding any balance weights to the wheel/tire assembly to correct any imbalance thereof, iteratively determining the actual imbalance of the wheel/tire assembly using the stored calibration coefficients, the stored additional calibration data, and the measured sensor output signals corresponding to the spin of the mounted wheel/tire assembly;

wherein the step of iteratively determining the actual imbalance of the wheel/tire assembly includes the step of initially selecting the sensor output signals obtained during the wheel/tire spin as trial values of sensor output signals.

22. The method as set forth in claim 21 wherein the step of iteratively determining the actual imbalance of the wheel/tire assembly includes the step of using said trial values and the calibration coefficients to estimate the imbalance of the wheel/tire assembly.

23. A method of operating a wheel balancer, said balancer having a spindle for mounting a wheel/tire assembly thereon, means for spinning said spindle about an axis, and at least two sensors for sensing imbalance forces, said method comprising;

spinning said spindle about said axis a plurality of times;

sensing imbalance forces due to known calibration imbalances;

determining a set of calibration coefficients for said wheel balancer from said sensed imbalance forces and from knowledge of said known calibration imbalances;

storing said set of calibration coefficients and additional calibration data in an electronic memory for subsequent use in balancing a wheel/tire assembly; and spinning a wheel/tire assembly mounted on the spindle, measuring and recording the corresponding output signals from said at least two sensors, and iteratively determining the actual imbalance of the wheel/tire assembly using the stored calibration coefficients, the stored additional calibration data, and the measured sensor output signals corresponding to the spin of the mounted wheel/tire assembly;

wherein the step of iteratively determining the actual imbalance of the wheel/tire assembly includes the step of initially selecting the sensor output signals obtained during the wheel/tire spin as trial values of sensor output signals;

wherein the step of iteratively determining the actual imbalance of the wheel/tire assembly includes the step of using said trial values and the calibration coefficients to estimate the imbalance of the wheel/tire assembly; and wherein the step of iteratively determining the actual imbalance of the wheel/tire assembly includes the step of calculating the sensor output signals which would result from the estimated imbalance by scaling the calibration data obtained during the calibration spins.

24. The method as set forth in claim 23 wherein the step of iteratively determining the actual imbalance of the wheel/tire assembly includes the step of comparing the measured sensor output signals with the calculated values of the sensor output signals based on the estimated imbalance.

25. The method as set forth in claim 24 wherein the step of iteratively determining the actual imbalance of the wheel/tire assembly includes selecting new trial values of the sensor output signals when the difference between the calculated values of the sensor output signals and the measured sensor output signals exceeds a predetermined threshold.

26. The method as set forth in claim 25 wherein the new trial values are selected by adding to the previous trial values a fraction of the difference between the previous trial values and their corresponding calculated values, and wherein the new trial values are used to create another estimate of the imbalance.

27. The method as set forth in claim 26 wherein the steps of claims 39 through 42 are repeated until the difference between the measured signal outputs and the calculated signals corresponding to the estimated imbalance falls below the predetermined threshold, the estimated imbalance at that point being the accepted estimate of the imbalance of the wheel/tire assembly.

28. The method as set forth in claim 27 further including the step of determining for the wheel/tire assembly at least a pair of weight placements and masses which would correct for the actual imbalance of the wheel/tire assembly.

29. A wheel balancer comprising:

a spindle for mounting a wheel/tire assembly thereon;

means for spinning said spindle about an axis;

at least two sensors for sensing imbalance forces;

means for determining a set of calibration coefficients for said wheel balancer from sensed imbalance forces due to known calibration imbalances during a plurality of calibration spins and from said known calibration imbalances; and electronic memory means for storing said set of calibration coefficients for subsequent use in balancing a wheel/tire assembly;

said electronic memory means having stored therein static calibration data which includes a known mass and known weight placement corresponding to at least one calibration spin and static calibration data which includes data representing each sensor output signal obtained during at least one calibration spin;

said electronic memory means further having couple calibration data stored therein which includes a known force couple corresponding to at least one calibration spin.

30. The wheel balancer as set forth in claim 29 wherein the electronic memory means has couple calibration data stored therein which includes data representing each sensor output corresponding to application of the known force couple to the spindle.

31. A wheel balancer comprising:

a spindle for mounting a wheel/tire assembly thereon;

means for spinning said spindle about an axis;

at least two sensors for sensing imbalance forces;

means for determining a set of calibration coefficients for said wheel balancer from sensed imbalance forces due to known calibration imbalances during a plurality of calibration spins and from said known calibration imbalances, each calibration spin comprising a plurality of revolutions of said spindle, at least one of the calibration spins being performed with a first known calibration imbalance of the spindle and at least a second of the calibration spins being performed with a second known calibration imbalance of the spindle; and electronic memory means for storing said set of calibration coefficients for subsequent use in balancing a wheel/tire assembly;

said determining means including means for iteratively determining the actual imbalance of a wheel/tire assembly mounted on the spindle, prior to adding any balance weights to the wheel/tire assembly to correct any imbalance thereof, by using the stored calibration coefficients, stored calibration data, and the measured sensor output signals corresponding to the spin of the mounted wheel/tire assembly.

32. A wheel balancer comprising:
a spindle for mounting a wheel/tire assembly thereon;
means for spinning said spindle about an axis;
at least two sensors for sensing imbalance forces;
means for determining a set of calibration coefficients for said wheel balancer from sensed imbalance forces due to known calibration imbalances during a plurality of calibration spins and from said known calibration imbalances, said determining means including means for extracting signal components of a predetermined frequency from the sensor output signals; and
electronic memory means for storing said set of calibration coefficients for subsequent use in balancing a wheel/tire assembly;
said extracting means including a digital signal processing chip and a Hamming window.

33. The wheel balancer as set forth in claim 32 wherein the coefficients of the Hamming window are stored in electronic memory, said extracting means including means for sampling the sensor output signals, said digital signal processing chip being programmed to apply the Hamming window to the sampled output signals of both sensors.

34. A wheel balancer comprising:
a spindle for mounting a wheel/tire assembly thereon;
means for spinning said spindle about an axis;
at least two sensors for sensing imbalance forces;
means for determining a set of calibration coefficients for said wheel balancer from sensed imbalance forces due to known calibration imbalances during a plurality of calibration spins and from said known calibration imbalances, said determining means includes means for extracting signal components of a predetermined frequency from the sensor output signals; and
electronic memory means for storing said set of calibration coefficients for subsequent use in balancing a wheel/tire assembly;
wherein the predetermined frequency corresponds to a nominal rotational speed of the spindle.

35. The wheel balancer as set forth in claim 34 including means for measuring the rotational speed of the spindle, wherein the determining means includes means for normalizing the output signals from the sensors for variation from the nominal rotational speed of the spindle in real time.

36. A method of operating a balancer, said balancer having a spindle for mounting a wheel/tire assembly thereon, means for spinning said spindle about an axis, and at least two sensors for sensing imbalance forces, said method comprising:
storing calibration coefficients in an electronic memory for subsequent use in balancing a wheel/tire assembly;
storing calibration data in electronic memory for subsequent use in balancing a wheel/tire assembly;
spinning a wheel/tire assembly mounted on the spindle;
measuring the corresponding output signals of the sensors; and
prior to adding any balance weights to the wheel/tire assembly to correct any imbalance thereof, iteratively determining the imbalance of the wheel/tire assembly using the stored calibration coefficients, the stored calibration data, and the measured sensor output signals corresponding to the spin of the mounted wheel/tire assembly.

37. A method of operating a balancer, said balancer having a spindle for mounting a wheel/tire assembly thereon, means for spinning said spindle about an axis, and at least two sensors for sensing imbalance forces, said method comprising:
storing calibration coefficients in an electronic memory for subsequent use in balancing a wheel/tire assembly;
storing calibration data in electronic memory for subsequent use in balancing a wheel/tire assembly;
spinning a wheel/tire assembly mounted on the spindle;
measuring the corresponding output signals of the sensors; and
prior to adding any balance weights to the wheel/tire assembly to correct any imbalance thereof, iteratively determining the imbalance of the wheel/tire assembly using the stored calibration coefficients, the stored calibration data, and the measured sensor output signals corresponding to the spin of the mounted wheel/tire assembly;
said step of iteratively determining the imbalance of the wheel/tire assembly including the step of initially selecting the sensor output signals obtained during the wheel/tire spin as trial values of sensor output signals.

38. The method as set forth in claim 37 wherein the step of iteratively determining the imbalance of the wheel/tire assembly includes the step of using said trial values and the calibration coefficients to estimate the imbalance of the wheel/tire assembly.

39. A method of operating a balancer, said balancer having a spindle for mounting a wheel/tire assembly thereon, means for spinning said spindle about an axis, and at least two sensors for sensing imbalance forces, said method comprising:
storing calibration coefficients in an electronic memory for subsequent use in balancing a wheel/tire assembly;
storing calibration data in electronic memory, for subsequent use in balancing a wheel/tire assembly;
spinning a wheel/tire assembly mounted on the spindle;
measuring the corresponding output signals of the sensors; and iteratively determining the imbalance of the wheel/tire assembly using the stored calibration coefficients, the stored calibration data, and the measured sensor output signals corresponding to the spin of the mounted wheel/tire assembly;

said step of iteratively determining the imbalance of the wheel/tire assembly including the step of initially selecting the sensor output signals obtained during the wheel/tire spin as trial values of sensor output signals;

wherein the step of iteratively determining the imbalance of the wheel/tire assembly includes the step of using said trial values and the calibration coefficients to estimate the imbalance of the wheel/tire assembly;

wherein the step of iteratively determining the imbalance of the wheel/tire assembly includes the step of calculating the sensor output signals which would result from the estimated imbalance by scaling and/or phase adjusting the calibration data.

40. The method as set forth in claim 39 wherein the step of iteratively determining the imbalance of the wheel/tire assembly includes the step of comparing the measured sensor output signals with the calculated values of the sensor output signals based on the estimated imbalance.

41. The method as set forth in claim 40 wherein the step of iteratively determining the imbalance of the wheel/tire assembly includes selecting new trial values of the sensor output signals when the difference between the calculated values of the sensor output signals and the measured sensor output signals exceeds a predetermined threshold.

42. The method as set forth in claim 41 wherein the new trial values are selected by adding to the previous trial values a fraction of the difference between the previous trial values and their corresponding calculated values.

43. The method as set forth in claim 41 wherein the new trial values are used to create another estimate of the imbalance.

44. The method as set forth in claim 43 wherein the steps of claims 40, 41, and 43 are repeated until the difference between the measured signal outputs and the calculated signals corresponding to the estimated imbalance falls below the predetermined threshold, the estimated imbalance at that point being the accepted measurement of the imbalance of the wheel/tire assembly.

45. The method as set forth in claim 44 further including the step of determining for the wheel/tire assembly at least a pair of weight placements and masses which would correct for the actual imbalance of the wheel/tire assembly.

46. Apparatus for measuring imbalance, said apparatus comprising:

a spindle for mounting a wheel/tire assembly thereon;

means for spinning the spindle about an axis;

sensor means for measuring imbalance forces corresponding to the spin of the spindle mounted wheel/tire assembly;

electronic memory means for storing calibration coefficients for subsequent use in balancing the wheel/tire assembly;

electronic memory means for storing calibration data for subsequent use in balancing the wheel/tire assembly; and means for iteratively determining the imbalance of the wheel/tire assembly prior to adding any balance weights to the wheel/tire assembly to correct any imbalance thereof, using the stored calibration coefficients, the stored calibration data, and the measured imbalance forces corresponding to the spin of the mounted wheel/tire assembly.

47. Apparatus for measuring imbalance, said apparatus comprising:

a spindle for mounting a wheel/tire assembly thereon;

means for spinning the spindle about an axis;

sensor means for measuring imbalance forces corresponding to the spin of the spindle mounted wheel/tire assembly;

electronic memory means for storing calibration coefficients for subsequent use in balancing the wheel/tire assembly;

electronic memory means for storing calibration data for subsequent use in balancing the wheel/tire assembly; and means for iteratively determining the imbalance of the wheel/tire assembly prior to adding any balance weights to the wheel/tire assembly to correct any imbalance thereof, using the stored calibration coefficients, the stored calibration data, and the measured imbalance forces corresponding to the spin of the mounted wheel/tire assembly;

wherein said means for iteratively determining the imbalance of the wheel/tire assembly includes means for initially selecting the sensor output signals obtained during the wheel/tire spin as trial values of sensor output signals.

48. The apparatus as set forth in claim 47 wherein the means for iteratively determining the imbalance of the wheel/tire assembly includes means for using said trial values and the calibration coefficients to estimate the imbalance of the wheel/tire assembly.

49. Apparatus for measuring imbalance, said apparatus comprising:

a spindle for mounting a wheel/tire assembly thereon;

means for spinning the spindle about an axis;

sensor means for measuring imbalance forces corresponding to the spin of the spindle mounted wheel/tire assembly;

electronic memory means for storing calibration coefficients for subsequent use in balancing the wheel/tire assembly;

electronic memory means for storing calibration data for subsequent use in balancing the wheel/tire assembly; and means for iteratively determining the imbalance of the wheel/tire assembly using the stored calibration coefficients, the stored calibration data, and the measured imbalance forces corresponding to the spin of the mounted wheel/tire assembly;

wherein said means for iteratively determining the imbalance of the wheel/tire assembly includes means for initially selecting the sensor output signals obtained during the wheel/tire spin as trial values of sensor output signals;

wherein the means for iteratively determining the imbalance of the wheel/tire assembly includes means for using said trial values and the calibration coefficients to estimate the imbalance of the wheel/tire assembly;

wherein the means for iteratively determining the imbalance of the wheel/tire assembly includes means for calculating the sensor output signals which would result from the estimated imbalance by scaling and/or phase adjusting the calibration data.

50. The apparatus as set forth in claim 49 wherein the means for iteratively determining the imbalance of the wheel/tire assembly includes means for comparing the measured sensor output signals with the calculated values of the sensor output signals based on the estimated imbalance.

51. The apparatus as set forth in claim 50 wherein the means for iteratively determining the imbalance of the wheel/tire assembly includes means for selecting new trial values of the sensor output signals when the difference between the calculated values of the sensor output signals and the measured sensor output signals exceeds a predetermined threshold.

52. The apparatus as set forth in claim 51 wherein the means for selecting new trial values are means for adding to the previous trial values a fraction of the difference between the previous trial values and their corresponding calculated values.

53. The apparatus as set forth in claim 51 wherein the means for selecting new trial values include means for creating another estimate of the imbalance.

54. The apparatus as set forth in claim 53 wherein the iterative determining steps of claims 50, 51, and 53 are repeated until the difference between the measured signal outputs and the calculated signals corresponding to the estimated imbalance falls below the predetermined threshold, the estimated imbalance at that point being the accepted measurement of the imbalance of the wheel/tire assembly.

55. The apparatus as set forth in claim 54 further including means for determining for the wheel/tire assembly at least a pair of weight placements and masses which would correct for the actual imbalance of the wheel/tire assembly.

* * * * *